3,325,290
METHOD OF VITAMINIZING ALBUMINOUS FOOD PRODUCTS
Hans Egon Wendelbo Hansson, Lund, Sweden, assignor to AB Tetra Pak, Lund, Sweden, a company of Sweden
No Drawing. Filed May 21, 1964, Ser. No. 369,304
Claims priority, application Sweden, May 22, 1963, 5,666/63
1 Claim. (Cl. 99—11)

This invention relates to a method of vitaminizing such albuminous food articles, particularly milk products, which were or will be subjected to heat treatment which causes albumen denaturation, and at the same time counteracting the deterioration in taste of the food caused by the albumen denaturation.

In order to be able to function satisfactorily, the human organism needs, as known, the supply of vitamins. The main part of these vitamins is delivered to us through the food we eat, the important vitamin C, i.e. ascorbic acid, being included first of all in milk and dairy products. Milk is an animal natural product, and its composition, and thus also its vitamin content varies according to season, the race of the animal and the fodder given to the animals.

The milk obtained by milking usually contains bacteria which can be harmful to those consuming the milk or products made thereof. For this reason, the milk is normally subjected to heat treatment for destroying the bacteria. This treatment can be carried out in the form of so-called pasteurization resulting only in the killing of certain types of bacterial, or in the form of a complete sterilization for killing all bacterial and microorganisms found in the milk. As a result of the aforesaid type of heat treatment, the proteins contained in the milk usually are denaturated. The denaturation products consist, at least partially, of compounds containing so-called SH-groups, i.e. sulphurhydrogen compounds causing the milk to taste unpleasant and cooked. The amount of denaturation products depends, of course, on the extent of the heat treatment, for example on the temperature prevailing during the heat treatment and on the duration of the treatment. Milk products heated to a high temperature for a long time will undergo a more pronounced deterioration in taste than a product subjected to a less intensive heat treatment.

In certain cases the important ascorbic acid can be destroyed by the heat treatment of the milk, which in its turn results in a deficient amount of C-vitamin in the final milk product. When conversion of the ascorbic acid is caused by the heat treatment, or when the milk due to aforementioned circumstances does not contain a sufficient amount of ascorbic acid, the milk can be subjected to vitaminization by adding to a suitable amount of new ascorbic acid.

The invention relates to a method of vitaminizing food articles, particularly milk and milk products, and to carry out the method in such a manner, that the deterioration in taste caused by the heat treatment of the milk is eliminated. The method according to the invention is characterized in that dehydroascorbic acid is added to the food article and caused to react chemically with the denaturation products formed during the heat treatment, whereby ascorbic acid is re-formed at the same time as the content of taste deteriorating substances is reduced.

The invention will be described in the following, wherein it is assumed that milk shall be refined to a sterile product. The milk to be treated is first subjected to the treatments which are usually applied in the processing of milk, i.e. homogenization, standardization etc. In order to obtain a sterile product, the milk must then be heated to a high temperature for such a long time that all bacteria and microorganisms found in the milk are made innocuous. By this treatment, it is true, the milk is made sterile but, as mentioned before, usually also part of the vitamins originally contained in the milk, such as for example ascorbic acid, is destroyed. Furthermore, proteins contained in the milk are denaturated which, for example, results in the formation of denaturation products containing so-called SH-groups. These denaturation products which give rise to an unpleasent cooked taste, have a strong reducing effect, due to their content of SH-groups, and therefore, readily react chemically with compounds rich in oxygen.

Dehydroascorbic acid which is an oxidized form of ascorbic acid, is reduced back to ascorbic acid when the compounds formed during the heat treatment and containing SH-groups react chemically with the dehydroascorbic acid.

Thus, by the said treatment the two objects were achieved that the milk product was compensated for the C-vitamin destruction caused by the heat treatment, and that at the same time the deterioration in taste resulting from the heat treatment was eliminated.

In the above short description of the steps comprised in the method, milk was chosen to be the object of treatment because milk can be regarded to be the most important product in this connection. The method according to the invention may, of course, also be applied to albuminous food other than milk, for example to cheese, cream etc. which are subject to heat treatment with albumen denaturation and vitamin destruction resulting therefrom.

What is claimed is:

In a method of treating a milk product comprising subjecting it to sterilizing heat treatment that causes the formation of taste deteriorating albumen denaturation products and the decomposition of its ascorbic acid contents, the step which consists in adding dehydroascorbic acid to said product in quantity equivalent to said albumen denaturation products.

References Cited

UNITED STATES PATENTS 2,761,780   9/1956   Stewart _____ 99—54

OTHER REFERENCES

Spanyar, P., et al., Zeitschrift fur Lebensmittel-Untersuchung und-forschung, vol. 120, May 8, 1963, pages 1–17 (pages 8 and 9 relied on).

A. LOUIS MONACELL, *Primary Examiner.*

RAYMOND N. JONES, L. M. SHAPIRO,
*Assistant Examiners.*